United States Patent
Park et al.

(10) Patent No.: US 7,579,702 B2
(45) Date of Patent: Aug. 25, 2009

(54) ELECTRIC POWER CONVERTING DEVICE AND POWER CONVERTING METHOD FOR CONTROLLING DOUBLY-FED INDUCTION GENERATOR

(75) Inventors: Jung-Woo Park, Changwon-si (KR); Ki-Wook Lee, Gimhae-si (KR); Dong-Wook Kim, Busan (KR)

(73) Assignee: Korea Electrotechnology Research Institute, Gyeongsangnam-do (KR)

( * ) Notice: Subject to any disclaimer, the term of this patent is extended or adjusted under 35 U.S.C. 154(b) by 384 days.

(21) Appl. No.: 11/647,124

(22) Filed: Dec. 28, 2006

(65) Prior Publication Data
US 2007/0182383 A1 Aug. 9, 2007

(30) Foreign Application Priority Data
Dec. 30, 2005 (KR) ............... 10-2005-0135062

(51) Int. Cl.
*H02P 9/48* (2006.01)
(52) U.S. Cl. ......................... 290/44; 322/37
(58) Field of Classification Search ............. 290/7, 290/6, 44, 39; 322/28, 37
See application file for complete search history.

(56) References Cited

U.S. PATENT DOCUMENTS

| | | | | |
|---|---|---|---|---|
| 5,587,647 A | * | 12/1996 | Bansal et al. ............... 322/45 |
| 5,798,631 A | * | 8/1998 | Spee et al. ............... 322/25 |
| 6,566,764 B2 | * | 5/2003 | Rebsdorf et al. ............... 290/44 |
| 6,784,634 B2 | * | 8/2004 | Sweo ............... 318/727 |
| 6,856,039 B2 | * | 2/2005 | Mikhail et al. ............... 290/44 |
| 6,933,625 B2 | * | 8/2005 | Feddersen et al. ............... 290/44 |
| 7,015,595 B2 | * | 3/2006 | Feddersen et al. ............... 290/44 |
| 7,253,537 B2 | * | 8/2007 | Weng et al. ............... 290/44 |
| 7,332,894 B2 | * | 2/2008 | Ichinose et al. ............... 322/29 |

* cited by examiner

*Primary Examiner*—Nicholas Ponomarenko
(74) *Attorney, Agent, or Firm*—Frommer Lawrence & Haug LLP; Ronald R. Santucci

(57) ABSTRACT

Disclosed herein is an electric power converting device and power converting method for controlling doubly-fed induction generators, which provides a synchronous generator for generating auxiliary electric power independently of a doubly-fed induction generator so as to generate electricity even in a system power-free environment, a grid-side converter is composed of a three-phase four-wire converter so as to generate a balanced voltage even in an unbalanced load condition and automatically synchronize a stator voltage of a doubly-fed induction generator and a system voltage with each other.

13 Claims, 12 Drawing Sheets

ELECTRIC POWER CONVERTING DEVICE AND POWER CONVERTING METHOD FOR CONTROLLING DOUBLY-FED INDUCTION GENERATOR

CROSS-REFERENCE TO RELATED APPLICATIONS

This application claims the benefit under 35 U.S.C. §119 (a) of Korean Patent Application No. 10-2005-0135062, filed in the Korean Intellectual Property Office on Dec. 30, 2005, the entire disclosure of which is incorporated herein by reference.

BACKGROUND OF THE INVENTION

1. Field of the Invention

The present invention relates to an electric power converting device, and more particularly, to an electric power converting device and power converting method for controlling doubly-fed induction generators, which provides a synchronous generator for generating auxiliary electric power independently of a doubly-fed induction generator so as to generate electricity even in a system power-free environment, a grid-side converter is composed of a three-phase four-wire converter so as to generate a balanced voltage even in an unbalanced load condition and automatically synchronize a stator voltage of a doubly-fed induction generator and a system voltage with each other.

2. Background of the Related Art

In general, a power converter refers to a device in which refines a low-quality primary energy having variable voltage and variable frequency characteristics caused by a variable wind speed or tidal current speed into a high-quality secondary energy having constant voltage and constant frequency characteristics so as to be linked to a power system in a new & renewable energy power generation system using wind power, tidal current power, etc.

Particularly, a generator most widely applied in a new & renewable energy power generation system market is a doubly-fed induction generator (DFIG) which features that a rotor winding is additionally provided to a cage-type generator so as to control slip power using the power converter.

FIG. 1 is a block diagram illustrating the construction of a power converter for a doubly-fed induction generator including an AC-to-DC converter and a DC-to-AC converter according to the prior art, FIG. 2 is a circuit diagram illustrating the construction of a power converter manufactured by Vestas Wind System according to the prior art, and FIG. 3 is a circuit diagram illustrating the construction of a power converter for a doubly-fed induction generator including two three-phase three-wire converters according to the prior art.

Referring to FIG. 1, it can be seen that the structure of the power converter used in the doubly-fed induction generator has a AC-DC-AC conversion function in which AC power is converted into DC power which in turn is converted into AC power.

Referring to FIG. 2, a grid-side converter for controlling the doubly-fed induction generator of the Vestas Wind System proposed in U.S. Pat. No. 6,856,040 B2 is configured of a three-phase bridge diode to have a unidirectional property.

However, such a configuration entails a problem in that it can recover energy from the system but cannot recover (generate) energy from the system using the grid-side converter.

In addition, this configuration encounters a structural problem in that an active power and a power factor of a stator side of the doubly-fed induction generator cannot be controlled directly. Specifically, the power factor is controlled by a passive capacitor, and energy transferred to the system employs a heat consumption method using a damping resistance, which makes it difficult to properly control the active power and the power factor of the stator side. Also, 20% or so of the amount of electricity generation is recovered from the rotor winding and this recovered energy is consumed as heat, which leading to a degradation of efficiency.

Referring to FIG. 3, to address and solve the above problems, U.S. Pat. No. 5,798,631A has proposed a 3-leg IGBT or 3-leg IGCT structure which includes a three-phase three-wire converter to allow the grid-side converter to recover energy bi-directionally.

Such a structure controls an active power and a power factor recovered from a stator side of the doubly-fed induction generator irrespective of the speed and load condition, and controls the power factor to be maintained at 1 so that 20% of energy recovered from a rotor side of the doubly-fed induction generator is recovered from the system and simultaneously the recovered energy is maximized.

Further, this structure controls a voltage applied across a capacitor connected between a generator-side converter and a grid-side converter to be always maintained at a constant magnitude so as to allow energy generated through the rotor winding to be transferred to the system.

However, the above structure also has a problem in that in case where the system is unstable and instantaneous power interruption occurs except an ordinary state, the generated voltage is not in a three-phase balanced state. That is, when the capacity of the system is very large and the capacity of the distributed generation is small, no problem occurs. But, there is caused a problem in that since the above-mentioned control properties cannot be maintained in an unbalanced condition (load, power supply, etc.), the new & renewable energy power generation system (wind power/tidal current/tidal current power/wave power generation system) is stopped.

Furthermore, the above structure entails a problem in that it can be used only in an environment where the system voltage exists since the power system voltage is directly applied to the stator winding to provide a magnetic flux component and hence the above structure is usable in a system-connected condition. Moreover, the synchronization characteristic in which a stator voltage of the doubly-fed induction generator and a system voltage are synchronized with each other is sensitively affected by the installation position of an encoder.

SUMMARY OF THE INVENTION

Accordingly, an aspect of exemplary embodiments of the present invention has been made to solve the aforementioned problems occurring in the prior art, and it is an object of the present invention to provide an electric power converting device for controlling a doubly-fed induction generator, which includes a synchronous generator for generating auxiliary electric power independently of the doubly-fed induction generator so as to separately generate electricity using the doubly-fed induction generator even in a system power-free environment.

Another object of the present invention is to provide a grid-side converter of a doubly-fed induction generator, which is composed of a three-phase four-wire converter so as to generate a balanced voltage even in an unbalanced load (voltage) condition and have a function of constantly controlling a DC link voltage and controlling a power factor to be maintained at 1.

Still another object of the present invention is to provide a method of controlling a generator-side converter of a doubly-fed induction generator, which automatically synchronize a stator voltage of the doubly-fed induction generator and a system voltage with each other at any time without being affected by the installation position of an encoder while maintaining a function of controlling active power and reactive power as it is.

A further object of the present invention is to provide a power converting method for controlling a doubly-fed induction generator so as to drive the electric power converting device for controlling the doubly-fed induction generator.

To accomplish the above object, according to one aspect of exemplary embodiments of the present invention, there is provided an electric power converting device for controlling doubly-fed induction generators, comprising:

a doubly-fed induction generator, a power converter for converting electric energy of the doubly-fed induction generator for application to an alternate current (AC) system, a controller for PWM-controlling the power converter, and the AC system adapted to use an AC power supplied thereto from the power converter, wherein the doubly-fed induction generator further comprises:

a synchronous generator for generating a separate auxiliary electric power independently of the doubly-fed induction generator; and an auxiliary converter for converting energy supplied thereto from the synchronous generator into a direct current (DC) power for application to the power converter, wherein the power converter includes:

a generator-side converter for converting an AC power converted from electric energy of the doubly-fed induction generator into a DC power;

a DC link capacitor connected to the generator-side converter in such a fashion as to be connected in parallel with the auxiliary converter, for storing electric energy; and a grid-side converter for re-converting the DC power converted by the generator-side converter into the AC power for application to the AC system, the DC link capacitor being disposed between the generator-side converter and the grid-side converter.

In a preferred embodiment of the present invention, the auxiliary converter comprises:

a rectifier connected to the synchronous generator for converting an AC power supplied from the synchronous generator into a DC power;

a smoothing capacitor connected in parallel with the rectifier for smoothing the output power of the rectifier; and a battery connected in parallel the smoothing capacitor and connected in parallel with the DC link capacitor of the power converter, for storing the output power of the smoothing capacitor.

In a more preferred embodiment of the present invention, the auxiliary converter further comprises:

a bypass resistor connected between the smoothing capacitor and the battery for bypassing power overcharged in the smoothing capacitor; and a switch connected in series with the bypass resistor for selectively operating the bypass resistor.

In a more preferred embodiment of the present invention, the grid-side converter of the power converter is configured of a three-phase four-wire structure having four legs each of which has two switching means.

To accomplish the above object, according to another aspect of exemplary embodiments of the present invention, there is also provided an electric power converting method of an electric power converting device for controlling doubly-fed induction generators, the power converting device including a first switch disposed between the synchronous generator and the auxiliary converter, a second switch the disposed between the auxiliary converter and the power converter, a third switch disposed between the power converter and the AC system, a fourth switch disposed between the doubly-fed induction generator and the AC system, a fifth switch disposed between the third switch and the fourth switch and the AC system, and a sixth switch disposed between the doubly-fed induction generator and the power converter, wherein the power converting method comprising the steps of:

(a) turning off the first to sixth switches to initialize the first to sixth switches;

(b) determining whether or not the electric power converting device for controlling a doubly-fed induction generator is in a normal state;

(c) if it is determined that the electric power converting device for controlling the doubly-fed induction generator is in a normal state, measuring the speed of a new and renewable energy source;

(d) comparing the measured the speed of a new and renewable energy source with a reference speed;

(e) if it is determined at step (b) that the electric power converting device for controlling the doubly-fed induction generator is not in a normal state, turning on the sixth switch so as to stop the electric power converting device;

(f) if it is determined at step (d) that the measured speed of the new and renewable energy source is larger than the reference speed, determining whether or not a terminal voltage of the battery of the auxiliary converter exceeds a reference voltage;

(g) if it is determined at step (d) that the measured speed of the new and renewable energy source is smaller than the reference speed, repeatedly performing the step (c);

(h) if it is determined at step (f) that the terminal voltage of the battery 330 of the auxiliary converter exceeds the reference voltage, i.e., the charging of the battery is completed, turning on the second switch so as to interconnect the auxiliary converter and the DC link capacitor;

(i) if it is determined at step (f) that the terminal voltage of the battery of the auxiliary converter does not exceed the reference voltage, i.e., the charging of the battery is not completed, turning on the first switch so as to charge the battery beyond the reference voltage through the auxiliary converter, and then repeatedly performing the step (f);

(j) converting a DC voltage of the DC link capacitor charged at step (f) into an AC voltage by the grid-side converter to generate an AC power for application to the AC system by turning on the third switch;

(k) determining whether or not the voltage generated from the doubly-fed induction generator and the voltage generated from the grid-side converter are synchronized with each other;

(l) if it is determined at step (k) that the voltage generated from the doubly-fed induction generator and the voltage generated from the grid-side converter are synchronized with each other, turning on the fourth switch;

(m) if it is determined at step (k) that the voltage generated from the doubly-fed induction generator and the voltage generated from the grid-side converter are not synchronized with each other, turning on the generator-side converter so as to regulate the magnitude of a d-axis current component within the generator-side converter for synchronization, and then repeatedly performing the step (k);

(n) turning on the fifth switch so as to transmit the AC voltage generated from the grid-side converter to the AC system; and (o) repeatedly performing the step (b) to determine whether or not the electric power converting device for controlling a doubly-fed induction generator is in a normal state.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
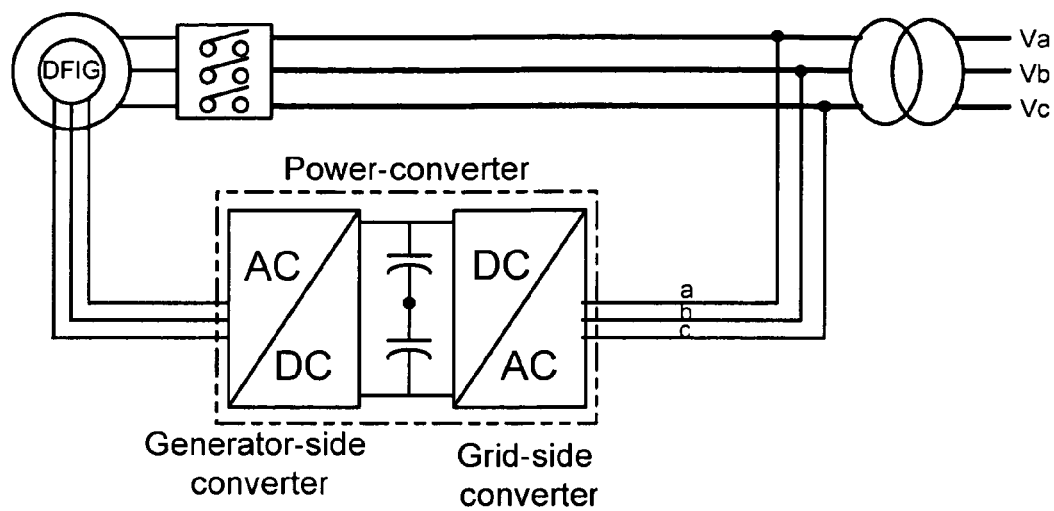
FIG. 1 is a block diagram illustrating the construction of a power converter for a doubly-fed induction generator including an AC-to-DC converter and a DC-to-AC converter according to the prior art.
Figure 2:
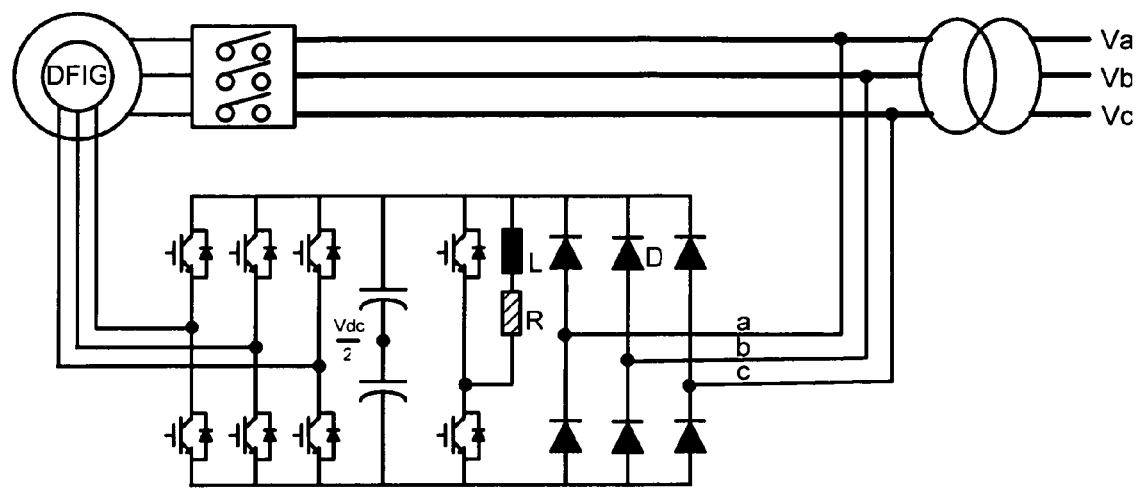
FIG. 2 is a circuit diagram illustrating the construction of a power converter manufactured by Vestas Wind System according to the prior art.
Figure 3:
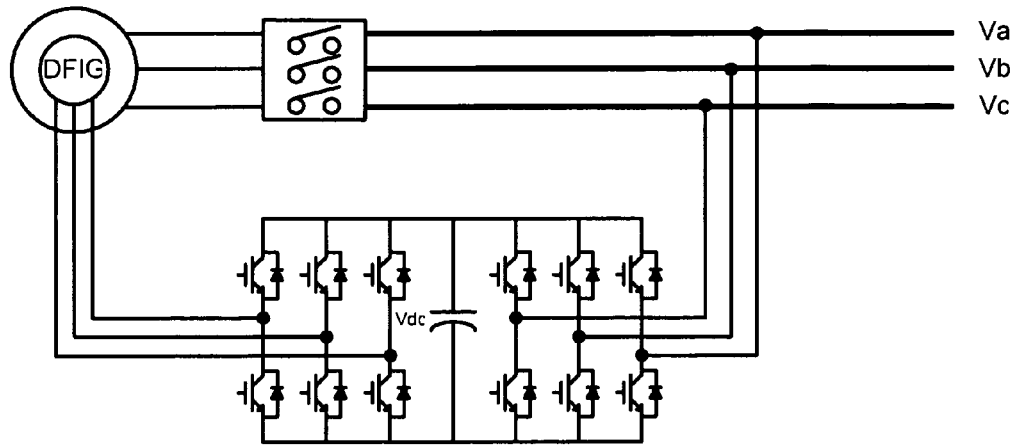
FIG. 3 is a circuit diagram illustrating the construction of a power converter for a doubly-fed induction generator including two three-phase three-wire converters according to the prior art.

Reference will now be made in detail to the construction and operation of an electric power converting device for controlling doubly-fed induction generators of the present invention with reference to the attached drawings. For the sake of facilitating a person's comprehensive understanding, it is noted that the same reference numerals will be used to denote identical or similar elements throughout the drawings.

Figure 4A:
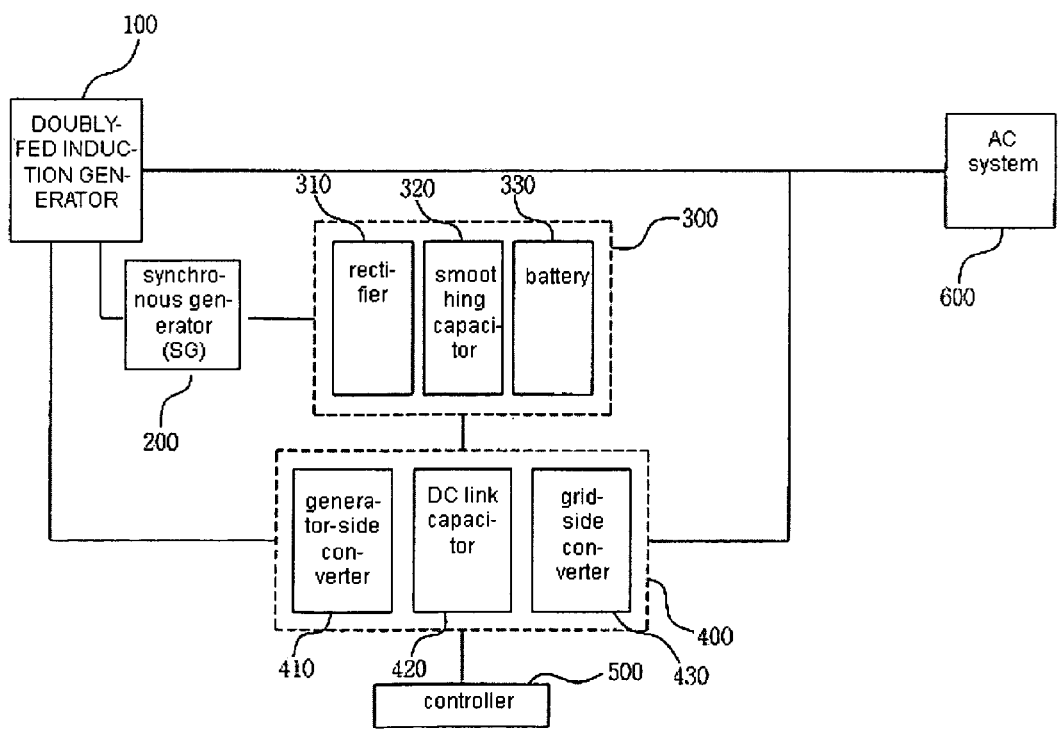
FIG. 4a is a block diagram illustrating the construction of an electric power converting device for controlling a doubly-fed induction generator according to the present invention.
Figure 4B:
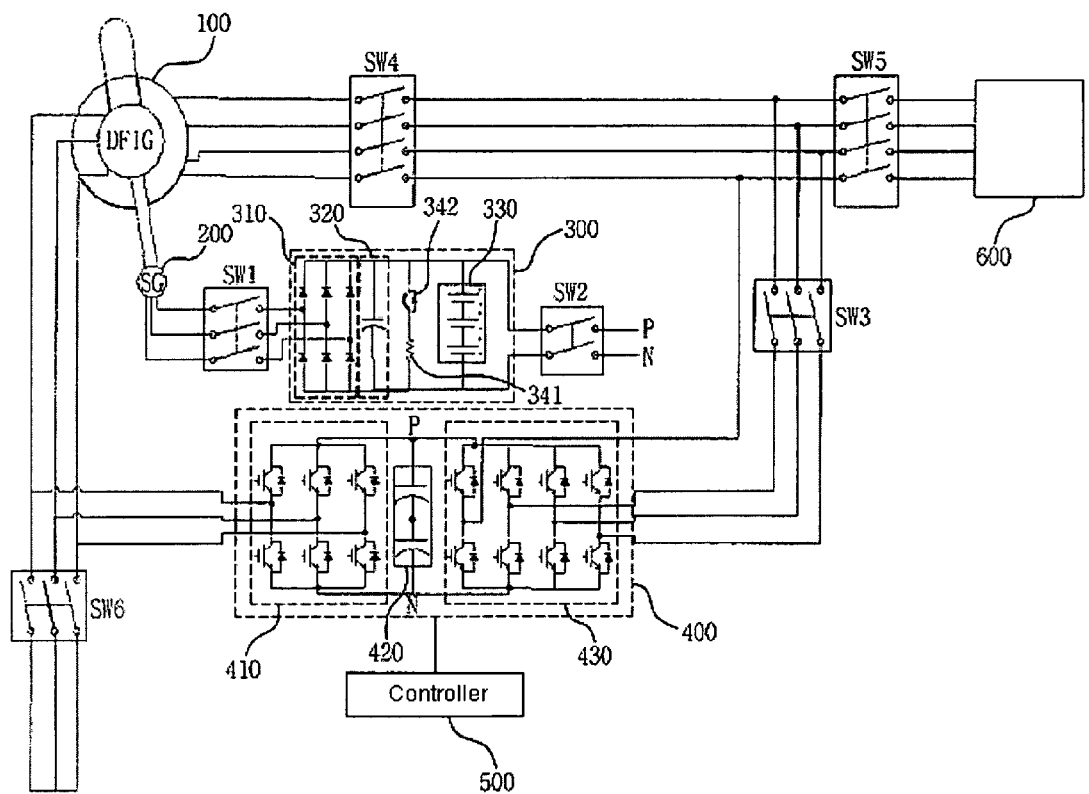
FIG. 4b is a circuit diagram illustrating the construction of an electric power converting device for controlling a doubly-fed induction generator according to one embodiment of the present invention.
Figure 5:
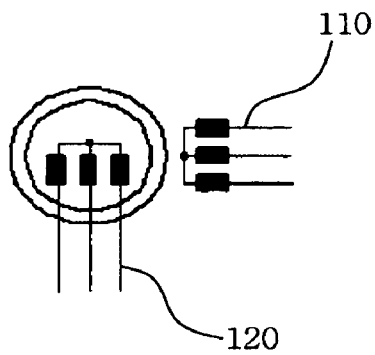
FIG. 5 is a schematic view illustrating the construction of a to-be-controlled doubly-fed induction generator of an electric power converting device for controlling a doubly-fed induction generator according to the present invention.
Figure 6:
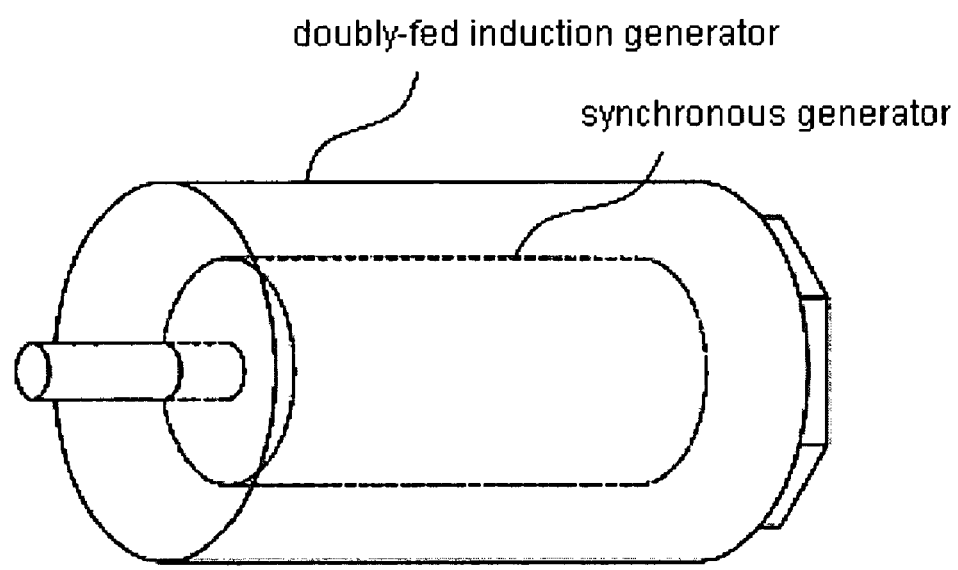
FIG. 6 is a schematic view illustrating an assembly in which a doubly-fed induction generator and a synchronous generator are implemented integrally according to the present invention.

FIG. 4a is a block diagram illustrating the construction of an electric power converting device for controlling a doubly-fed induction generator according to the present invention, FIG. 4b is a circuit diagram illustrating the construction of an electric power converting device for controlling a doubly-fed induction generator according to one embodiment of the present invention, FIG. 5 is a schematic view illustrating the construction of a to-be-controlled doubly-fed induction generator of an electric power converting device for controlling a doubly-fed induction generator according to the present invention, and FIG. 6 is a schematic view illustrating an assembly in which a doubly-fed induction generator and a synchronous generator are implemented integrally according to the present invention.

Referring to FIG. 4a, the electric power converting device for controlling the doubly-fed induction generators includes a doubly-fed induction generator 100, a synchronous generator 200, an auxiliary converter 300, a power converter 400, a controller 500 and an AC system 600.

The doubly-fed induction generator 100 converts kinetic energy into electric energy, and the power converter 400 is connected to the doubly-fed induction generator so as to refines a low-quality electric energy into a high-quality electric energy for application to the AC system. The controller 500 PWM-controls the power converter 400, and the AC system 600 receives an AC power supplied from the power converter 400.

The doubly-fed induction generator 100 is adapted to be connected to a power transmission means (not shown) such as a blade for converting a new and renewable energy source (wind power, tidal current power, tidal power, wave power, etc.) having a linear kinetic energy into a kinetic energy having a rotary force.

In this case, the doubly-fed induction generator 100 converts the kinetic energy having a rotary force into an electric energy and is constructed to be connected at a shaft thereof to a main shaft of the blade via a speed increaser.

Referring to FIG. 5, the doubly-fed induction generator 100 consists of a stator 110 as a primary winding and a rotor 120 as a secondary winding for controlling a slip power. Here, the stator 110 is a main passageway for transmission of energy of the doubly-fed induction generator 100, and the rotor 120 is an auxiliary passageway through which the slip power is transmitted.

Referring to FIG. 6, there is shown an implementation of the structure in which the doubly-fed induction generator 100 and the synchronous generator 200 are connected integrally. The integral structure of the doubly-fed induction generator 100 and the synchronous generator 200 allows the synchronous generator 200 to rotate using a part of a rotary force transmitted to the main shaft of the blade to secure an auxiliary power. In this case, the doubly-fed induction generator 100 and the synchronous generator 200, as shown in FIG. 6, are constructed integrally with each other by sharing a coaxial shaft, but may be constructed in a separated type using a means such as a gear.

The synchronous generator 200 is a generator for securing an auxiliary power required by the power converter 400, which independently secures a separate DC power required by the doubly-fed induction generator 100 and the power converter 400 so as to enable conversion of power even in a system power-free condition.

Here, the synchronous generator 200 is classified into a type which has a built-in a permanent magnet and a type which a built-in winding. The synchronous generator is preferably constructed of the permanent magnet-embedded type since it does not require a separate additional device and can generate an output voltage proportional to the number of revolutions of a rotor of the generator.

The auxiliary converter 300 includes a rectifier 310, a smoothing capacitor 320 and a battery 33. A bypass resistor 341 and a switch 342 are further provided between the smoothing capacitor 320 and the battery 330. At this time, the auxiliary converter 300 is connected with the synchronous generator 100 so as to convert energy supplied thereto from the synchronous generator 200 into a DC power for application to the power converter 400.

In this case, the rectifier 310 is connected to the synchronous generator 200 so as to convert an AC power supplied from the synchronous generator into a DC power, and the smoothing capacitor 320 is connected in parallel with the rectifier 310 to smooth the output power of the rectifier 310.

In addition, the battery 330 is connected in parallel the smoothing capacitor 320 and is connected in parallel with the DC link capacitor 420 of the power converter so as to store the output power of the smoothing capacitor 320.

Here, the bypass resistor 341 is connected between the smoothing capacitor 320 and the battery 330 so as to bypass power overcharged in the smoothing capacitor 320, and the switch 342 is connected in series with the bypass resistor 341 so as to selectively operate the bypass resistor.

Specifically, the present invention features that DC power stored in the battery 330 is applied across the DC link capacitor 420 of the power converter 400 so as to allow the electric power converting device for controlling the doubly-fed induction generator to independently secure energy for activation regardless of the system power.

The power converter 400 includes a generator-side converter 410, a DC link capacitor 420 and a grid-side converter 430.

The generator-side converter 410 converts an AC power converted from electric energy of the doubly-fed induction generator 100 into a DC power, the DC link capacitor 420 is disposed between the generator-side converter 410 and the grid-side converter 430 in such a fashion as to be connected in parallel with the auxiliary converter 300 so as to store electric energy.

Here, the DC link capacitor 420 generates an independent power source irrespective of the system voltage, i.e., without external power source using the synchronous generator 200 so as to charge voltage at a DC link terminal (a terminal between a P node and an N node inside the power converter.

The grid-side converter 430 re-converts the DC power converted by the generator-side converter 410 into the AC power for application to the AC system 600.

As described above, in case of adopting the independent source type, since the grid capacity of the independent source is small, an unbalanced voltage is generated due to an unbalanced condition such as a non-linear load, an unbalanced load, an unbalanced generation.

The present invention proposes a grid-side converter 430 having a three-phase four-wire converter or four-leg converter structure in which a fourth neutral leg is additionally included in a conventional three-phase three-wire converter or three leg converter so as to generate a balanced voltage even in such an unbalanced condition.

The grid-side converter 430 controls a zero sequence voltage component or a zero sequence current component generated in an unbalanced condition. That is, the grid-side converter 430 is constructed to apply the zero sequence voltage to control neutral current of the AC system 600.

Specifically, the grid-side converter 430 is configured of a three-phase four-wire structure having four legs each of which has two switching means 431, and the center of an additionally provided fourth leg is connected with a neutral point of the AC system. Here, the switching means 431 is preferably constructed of an insulated gate bipolar transistor (IGBT).

Resultantly, the grid-side converter 430 is configured of the three-phase four-wire converter structure so that the electric power converting device for controlling the doubly-fed induction generator according to the present invention has a strong control property with respect to the above-mentioned unbalanced condition, and the generator-side converter 410 employs the same three-phase three-wire structure as an existing structure.

In addition, the electric power converting device for controlling the doubly-fed induction generator according to the present invention is constructed such that the generator-side converter 410 has three-phase three-wire converter structure and the grid-side converter 430 has the three-phase four-wire converter so that 1) an active power and a power factor of a stator of the doubly-fed induction generator is controlled using the generator-side converter 410 of the doubly-fed induction generator 100, and 2) a DC link voltage and a system power factor are normally controlled using the grid-side converter 430 even when the system voltage is in an unbalanced condition.

The controller 500 serves to PWM-controls the power converter 400, and preferably SVPWM (Space Vector Power Width Modulation)-controls the power converter 400 in the electric power converting device for controlling the doubly-fed induction generator according to the present invention. The control process of the controller 500 will be described hereinafter in detail.

The AC system 600 is adapted to use an AC power supplied thereto from the power converter 400. The electric power converting device for controlling the doubly-fed induction generator according to the present invention includes an AC system having an unbalanced condition due to a non-linear load or an unbalanced load.

Referring to FIG. 4b, the electric power converting device for controlling the doubly-fed induction generator according to a preferred embodiment of the present invention includes an auxiliary converter 300 having a rectifier 310, a smoothing capacitor 320 and a battery 330, a power converter having a generator-side converter 410, a DC link capacitor 420 and a grid-side converter 430, and first to sixth switches (SW1~SW6) for driving the electric power converting device for controlling the doubly-fed induction generator. In this case, the second switch electrically connects the auxiliary converter 300 and the power converter 400 through the P terminal and the N terminal.

Now, the control method of the grid-side converter 430 having the three-phase four-wire converter structure will be described hereinafter.

Figure 7:
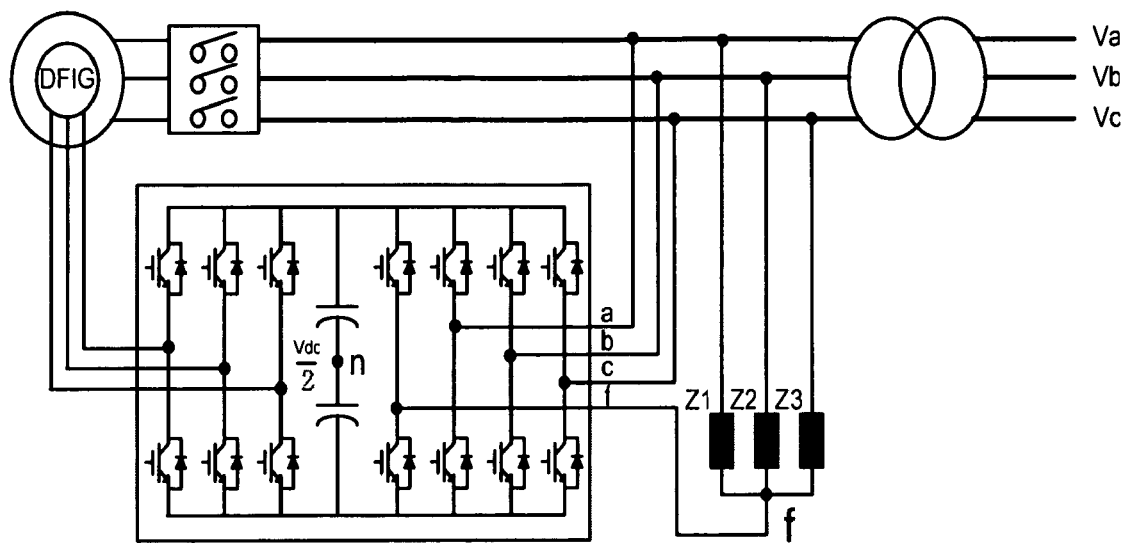
FIG. 7 is a circuit diagram illustrating the construction of an electric power converting device for controlling a doubly-fed induction generator, which includes a three-phase four-wire grid-side converter and has a strong control property even in an unbalanced load according to the present invention.
Figure 8:
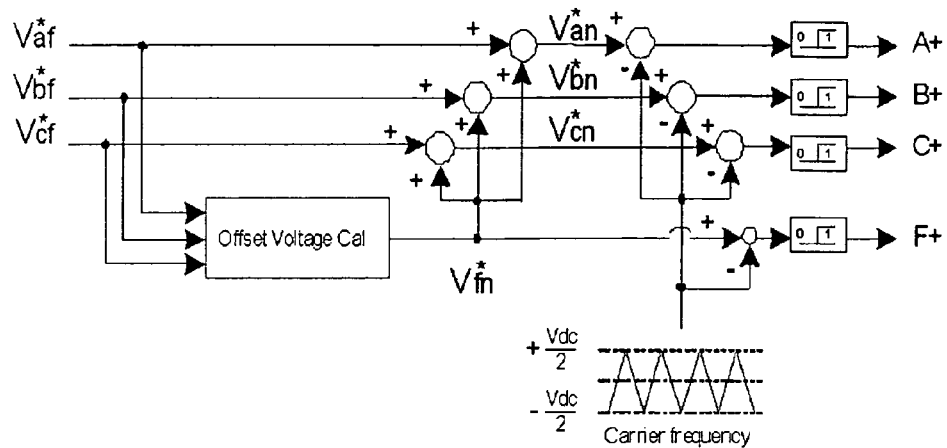
FIG. 8 is a block diagram illustrating SMPWM control process of a three-phase four-wire grid-side converter.
Figure 9:
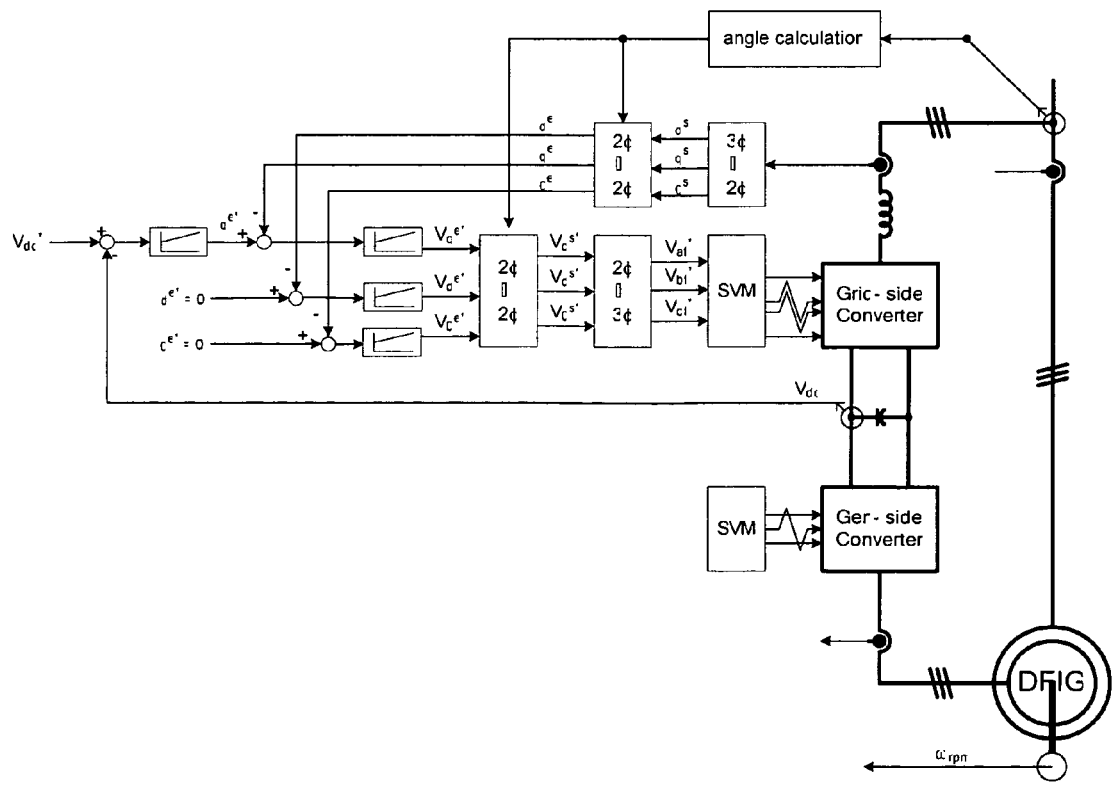
FIG. 9 is a block diagram illustrating a function of constantly controlling a DC link voltage and controlling a power factor to be maintained at 1 as well as the process of converting a coordinate system and controlling an SVPWM so as to control a three-phase four-wire grid-side converter.

FIG. 7 is a circuit diagram illustrating the construction of an electric power converting device for controlling a doubly-fed induction generator, which includes a three-phase four-wire grid-side converter and has a strong control property even in an unbalanced load according to the present invention, FIG. 8 is a block diagram illustrating SMPWM control process of a three-phase four-wire grid-side converter, and FIG. 9 is a block diagram illustrating the process of conversion of a coordinate system and control of an SVPWM of the three-phase four-wire grid-side converter.

Referring to FIG. 7, the following Equation can be obtained from the grid-side converter 430.

$$V_{an} = V_{af} + V_{fn}$$
$$V_{bn} = V_{bf} + V_{fn}$$
$$V_{cn} = V_{cf} + V_{fn} \quad \text{[Equation 1]}$$

Also, $V_{af}$, $V_{bf}$, $V_{cf}$, i.e., a voltage between a three-phase leg and an additionally provided fourth leg can be expressed by a pole voltage $V_{abcn}$ and an offset voltage $V_{fn}$.

$$V_{af} = V_{an} - V_{fn}$$
$$V_{bf} = V_{bn} - V_{fn}$$
$$V_{cf} = V_{cn} - V_{fn} \quad \text{[Equation 2]}$$

where, the offset voltage $V_{fn}$ for positioning a nonzero switching vector at the center of a sampling period ($T_s$) in the three-phase four-wire SVPWM (Space Vector Power Width Modulation) is set as follows:

$$V_{fn} = \begin{cases} -\dfrac{V_{max}}{2}, & \text{if } V_{min} > 0 \\ -\dfrac{V_{min}}{2}, & \text{if } V_{max} < 0 \\ -\dfrac{V_{max} + V_{min}}{2}, & \text{Otherwise} \end{cases} \quad \text{\{Equation 3\}}$$

where, $V_{min}$, $V_{max}$, and $V_{mid}$ are functions defined as follows. Also, an asterisk (*) indicated at the right top of the voltage in Equation 4 denotes a reference value of the voltage.

$$V_{min} = \text{Min}(V^*_{af}, V^*_{bf}, V^*_{cf})$$
$$V_{max} = \text{Max}(V^*_{af}, V^*_{bf}, V^*_{cf})$$
$$V_{mid} = \text{Mid}(V^*_{af}, V^*_{bf}, V^*_{cf}) \quad \text{[Equation 4]}$$

Referring to the above Equations and FIG. 7, the pole voltage should be limited to the following range:

$$-\frac{V_{dc}}{2} \leq V_{an} \leq \frac{V_{dc}}{2} \quad \text{[Equation 5]}$$
$$-\frac{V_{dc}}{2} \leq V_{bn} \leq \frac{V_{dc}}{2}$$
$$-\frac{V_{dc}}{2} \leq V_{cn} \leq \frac{V_{dc}}{2}$$
$$-\frac{V_{dc}}{2} \leq V_{fn} \leq \frac{V_{dc}}{2}$$

Resultantly, the offset voltage of the Equation 3 is expressed as a reference value using a function which selects a middle value among the following three values:

$$V^*_{fn} = mid\left(-\frac{V_{max}}{2}, -\frac{V_{min}}{2}, -\frac{V_{max} + V_{min}}{2}\right) \quad \text{\{Equation 6\}}$$

The use of the offset voltage value determined from above Equation 3 or 6 and the Equation 1 can derive respective pole voltages $V_{an}$, $V_{bn}$ and $V_{cn}$.

As a result, since the pole voltage can be derived, the on-time for the switching means positioned at the upper ends of four legs of the grid-side converter 430 is derived as follows:

$$T_a = \frac{T_s}{2} + \frac{V_{an}}{V_{dc}} T_s \quad \text{[Equation 7]}$$
$$T_b = \frac{T_s}{2} + \frac{V_{bn}}{V_{dc}} T_s$$
$$T_c = \frac{T_s}{2} + \frac{V_{cn}}{V_{dc}} T_s$$
$$T_f = \frac{T_s}{2} + \frac{V_{fn}}{V_{dc}} T_s$$

Referring to FIG. 8, there is shown the derivation process of the above Equations for an SMPWM (SVM) control method of a three-phase four-wire grid-side converter.

Referring to FIG. 9, it can be seen that the three-phase four-wire grid-side converter 430 of the electric power converting device for controlling a doubly-fed induction generator according to the present invention controls an balanced output voltage, constantly controls a DC link voltage, and controls the power factor to be maintained at 1 based on conversion of a coordinate system and control of an SVPWM.

In FIG. 9, a "3Φ->2Φ" block denotes a step in which a three-phase (a, b, c) rest coordinate system is converted into a two-phase (d, q) rest coordinate system, and a "2Φ->3Φ" block denotes a step in which the two-phase (d, q) rest coordinate system is converted into the three-phase (a, b, c) rest coordinate system. Also, a "2Φ->2Φ" block denotes a step in which a two-phase (d, q) rest coordinate system is converted into a two-phase (d, q) synchronous coordinate system, and a "2Φ->2Φ" block denotes a step in which the two-phase (d, q) synchronous coordinate system is converted into the two-phase (d, q) rest coordinate system. In this case, since the coordinate conversion equation used is a known equation, its detailed description will be omitted.

Also, a d-axis current reference value ($i_d^{e*}$) is set to 0 so as to control a grid-side power factor to be maintained at 1, and a zero sequence component reference value ($i_0^{e*}$) is set to 0 so as to control a load voltage to be always maintained in a three-phase balanced state.

Further, a-axis current reference value ($i_q^{e*}$) is set as an output value to constantly control the voltage stored in the DC link capacitor 420 disposed between the generator-side converter 410 and the grid-side converter 430.

Figure 10:
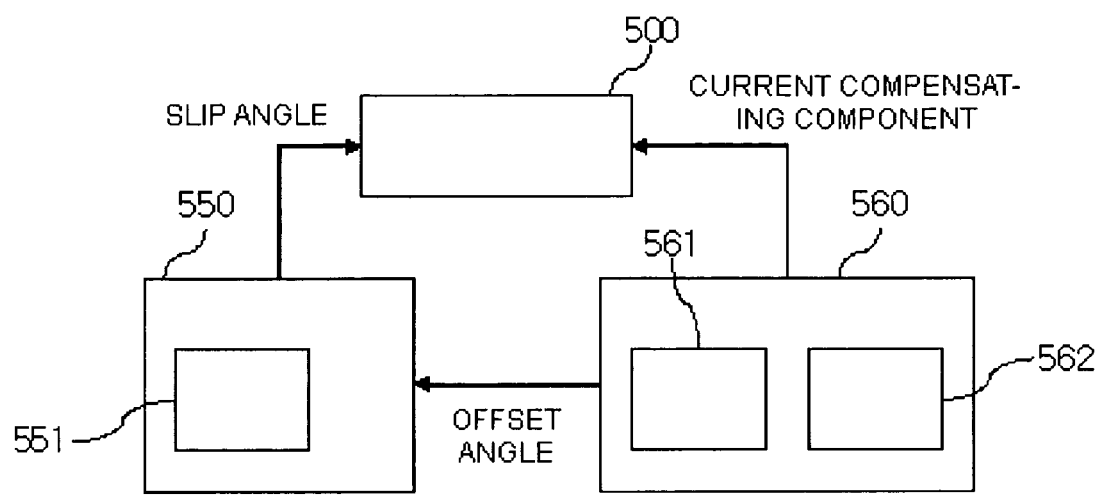
FIG. 10 is a block diagram illustrating the construction of a control unit of a doubly-fed induction generator having an automatic system connection function according to the present invention.
Figure 11:
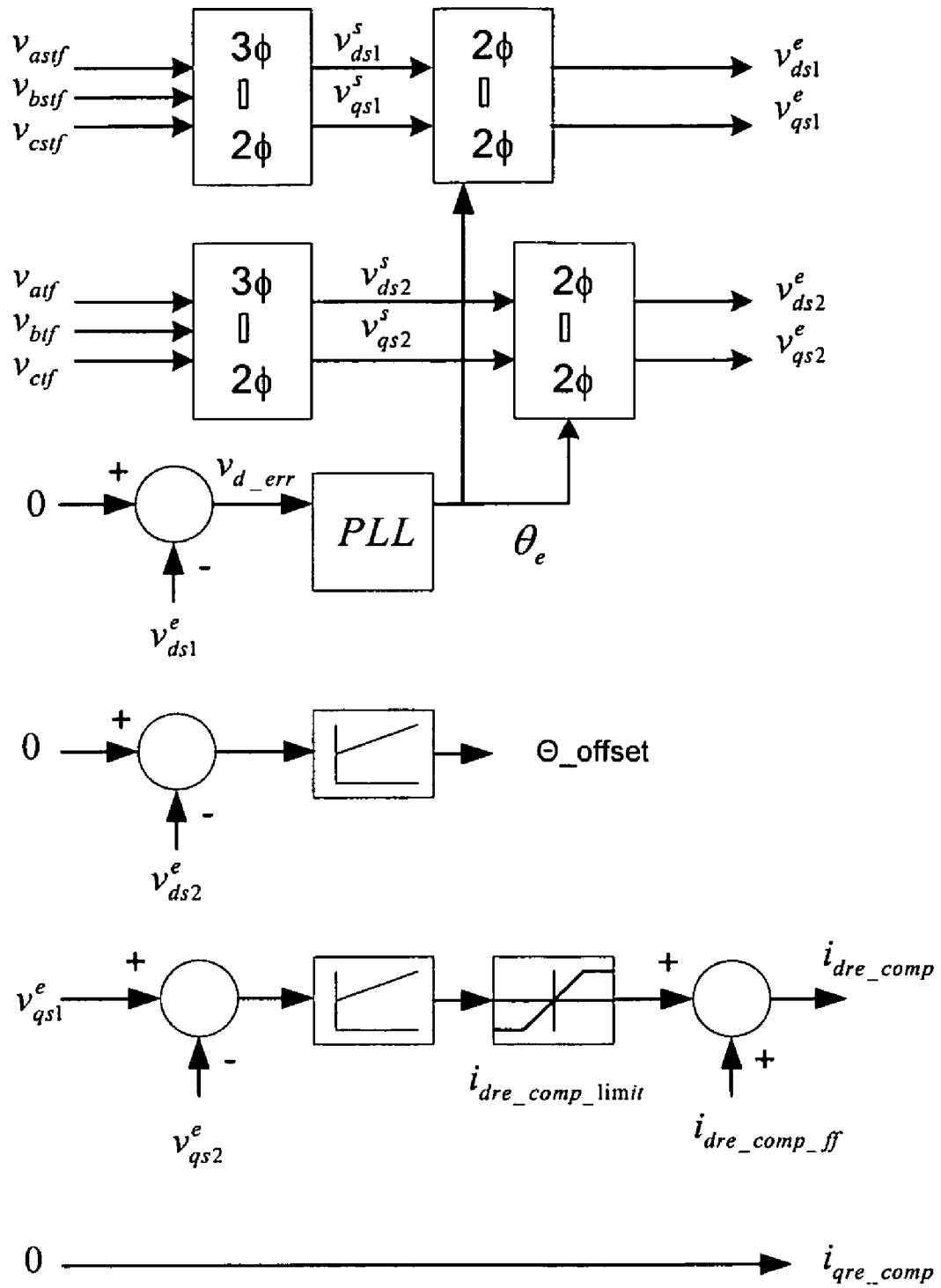
FIG. 11 is a block diagram illustrating a method of synchronizing a stator voltage of the doubly-fed induction generator and a system voltage with each other according to the present invention.

FIG. 10 is a block diagram illustrating the construction of a control unit of a doubly-fed induction generator having an automatic system connection function according to the present invention, and FIG. 11 is a block diagram illustrating a method of synchronizing a stator voltage of the doubly-fed induction generator and a system voltage with each other according to the present invention.

Figure 12:
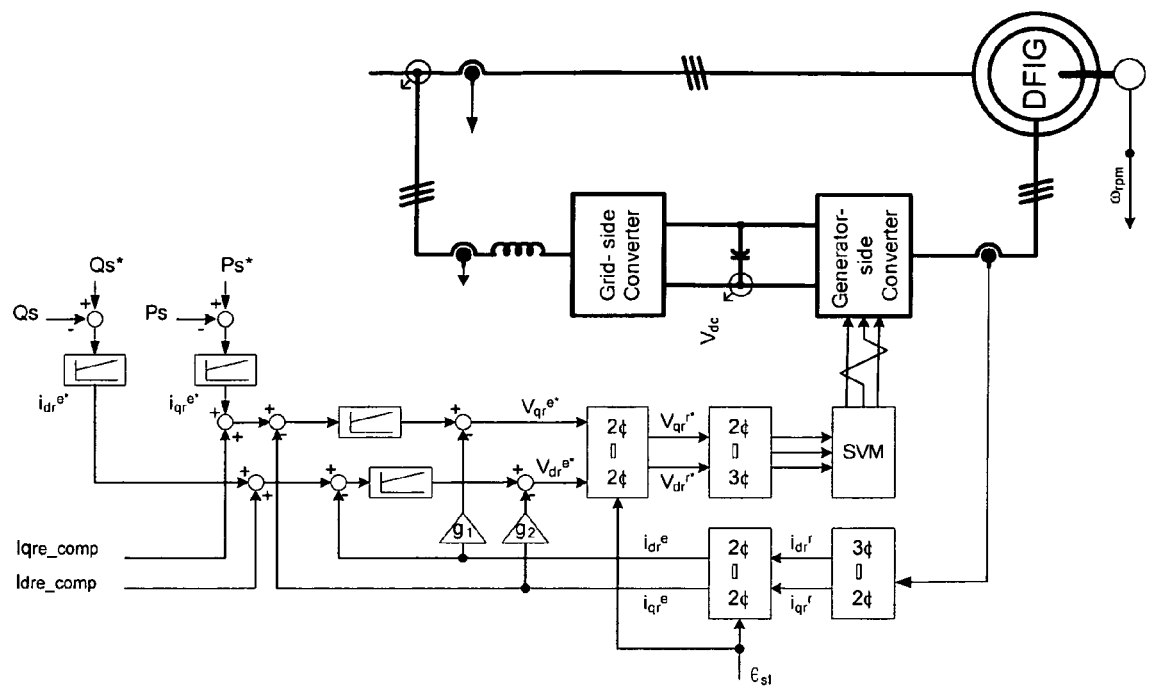
FIG. 12 is a block diagram illustrating a method of synchronizing a stator voltage of the doubly-fed induction generator and a system voltage with each other and concurrently controlling active power and reactive power according to the present invention.

Also, FIG. 12 is a block diagram illustrating a method of synchronizing a stator voltage of the doubly-fed induction generator and a system voltage with each other and concurrently controlling active power and reactive power according to the present invention. This is intended to control three-phase three-wire generator-side converter.

Referring to FIG. 10, the control unit of the doubly-fed induction generator having an automatic system connection function according to the present invention includes the controller 500 of the doubly-fed induction generator of FIG. 4a, a slip angle calculator 550, and a synchronization means 560.

The controller 500 controls a q-axis current compensating component ($i_{qre\_comp}$) to be combined at a position where a q-axis reference value component of a rotor current determined as a controlled active power (controlled speed, controlled torque) output and a q-axis component of an actual rotor current meet with each other, and controls a d-axis current compensating component ($i_{dre\_comp}$) to be combined at a position where a d-axis reference value component of a rotor current determined as a controlled reactive power (or controlled power factor) output and a d-axis component of an actual rotor current meet with each other to control the current of the d-axis and q-axis so as to control an active power and a reactive power in a stator winding.

The slip angle calculator 550 receives a rotational angle ($\theta_r$) of the doubly-fed induction generator from the generator-side converter 410, an offset angle ($\theta_{offset}$) generated from the synchronization means 560, and a stator angle ($\theta_s$) calculated from a stator voltage so as to output a slip angle ($\theta_{sl}$) for application to the controller 500.

In this case, the slip angle calculator 550 determines the slip angle ($\theta_{sl}$) using the stator voltage angle ($\theta_s$) calculated from voltage induced from the stator winding, the rotational angle ($\theta_r$) of the generator and offset angle ($\theta_{offset}$) output from the synchronization means 560. At this time, the slip angle ($\theta_{sl}$) is used in a coordinate conversion process to control a slip power (or slip speed).

Referring to FIG. 11, the slip angle calculator 550 further includes a low pass filter (LPF) 551 having a cut-off frequency of approximately 5 kHz when a grid-side phase voltage $v_{as}$, $v_{bs}$, $v_{cs}$ and a voltage $v_{at, vbt, vct}$ induced to the stator winding are converted into a d-q coordinate system to calculate $V_{ds1}^e$, $V_{qs1}^e$, $V_{ds2}^e$, $V_{qs2}^e$.

Here, the synchronization means 560 calculates the offset angle ($\theta_{offset}$) to output the calculated result to the slip angle calculator 550 so as to control phase synchronization, and outputs a d-axis current compensating component ($i_{dre\_comp}$) of the rotor current and a q-axis current compensating component ($i_{qre\_comp}$) of the rotor current to the controller 500.

The synchronization means 560 allows a voltage error ($v_{d\_err}$) between a d-axis component ($v_{ds2}^e$) of the voltage induced from the stator winding and a d-axis component ($v_{ds1}^e$) of the system voltage to be controlled to be maintained at 0 using a PI controller 561 so as to make the voltage induced from the stator winding and the system voltage identical to each other in terms of phase, and determines an output of the PI controller 561 as the offset angle ($\theta_{offset}$) for correcting an encoder phase angle.

In addition, the synchronization means 560 allows a voltage error ($V_{d\_err}$) between a q-axis component ($v_{qs2}^e$) of the voltage induced from the stator winding and a q-axis component ($V_{qs1}^e$) of the system voltage to be controlled to be maintained at 0 using the PI controller 561 so as to make the voltage induced from the stator winding and the system voltage identical to each other in terms of magnitude, and determines an output of the PI controller 561 as a q-axis current compensating component ($i_{dre\_comp}$). Here, the q-axis current compensating component ($i_{dre\_comp}$) is always set to 0.

Moreover, the synchronization means 560 further comprises a limiter 562 for preventing the d-axis current compensating component ($i_{qre\_comp}$) of the rotor current from being increased sharply by an output of the PI controller 561, and has a feedback component so as to increase a convergence speed.

Here, the feedback component ($i_{dre\_comp\_ff}$) is set to $$i_{dre\_comp\_ff} = \frac{E}{\omega_e L_o},$$

and is derived as follows so as to be adjusted at less than 100%:

$$i_{dre\_comp\_limit} \leq \frac{E}{\omega_e L_o} * \text{Scaler} \quad (0.0 \leq \text{Scaler} \leq 1.0).$$

There is proposed an automatic synchronization method in which the system connection is automatically performed with respect to an arbitrary encoder position by the control unit of a doubly-fed induction generator having an automatic system connection function according to the present invention, which is strong for a variable system voltage and frequency during the operation, and which always satisfies a synchronization condition for the system connection in a variation condition of a mutual inductance as a generator equivalent integer.

Also, when the rotor current of the doubly-fed induction generator is represented as the d-q coordinate system, it can be divided into the d-axis component and the q-axis component. At this time, a difference between a d-axis component of the voltage induced to a stator side and a d-axis component of a grid-side voltage becomes an input signal of the PI controller 561, a result of the PI controller 561 is designed to be the offset angle ($\theta_{offset}$) for synchronization, the q-axis component of the voltage induced to a stator side is designed to be identical to the q axis component of a grid-side voltage using the PI controller, and then the output of the PI controller is designed to be a current compensating component added to the d-axis component of the rotor current.

In an initial synchronization step, but not a case where the rotational speed of the generator or the active power is controlled, the d-axis current component of the rotor is identical in magnitude to the current compensating component added for synchronization, which means that the d-axis current component is operated as a parameter for adjusting the magnitude of the stator voltage induced to the stator side.

First, there is proposed a method of making voltage phases identical with each other, in which it is assumed that when $v_{ds2}^e$ is equal to $v_{ds1}^e$, the voltage phases are the same, and the phase angle of an encoder is compensated so that a difference between the voltage phases becomes 0. When a parameter for compensating the encoder phase angle is $\theta_{offset}$, a voltage error value ($V_{d\_err}$) and the offset angle ($\theta_{offset}$) are determined by the following Equation 8 using the PI controller 562:

$$V_{d\_err} = -v_{ds2}^e$$

$$\theta_{offset} = PI(V_{d\_err}). \quad \text{[Equation 8]}$$

Then, there is proposed a method of making voltage magnitudes identical with each other, in which it is assumed that when $v_{qs2}^e$ is equal to $V_{qs1}^e$, the voltage magnitudes are the same, and the d-axis current component is compensated so that a difference between the voltage magnitudes becomes 0. When a parameter for compensating the d-axis current component is $i_{dre\_comp}$, a voltage error value ($v_{q\_err}$) and the q-axis current compensating value ($i_{dre\_comp}$) are determined by the following Equation 9 using the PI controller 562:

$$V_{q\_err} = V_{qs1}^e - V_{qs2}^e$$

$$i_{dre\_comp} = \text{Limit}\{PI(V_{q\_err}), i_{dre\_comp\_limit}\} + i_{dre\_comp\_ff} \quad \text{[Equation 9]}$$

where limit {value1, value2} indicating a limit function denotes a function indicating that when value1 is greater than value2, value1 is replaced with value2. The feedback component $i_{dre\_comp\_ff}$ can be determined by the following Equation 10:

$$i_{dre\_comp\_ff} = \frac{E}{\omega_e L_o} \quad \text{[Equation 10]}$$

$$i_{dre\_comp\_limit} \leq \frac{E}{\omega_e L_o} * \text{Scaler}$$

$$0.0 \leq \text{Scaler} \leq 1.0$$

Also, since the q-axis current component is not associated with a process of synchronizing voltage vectors, when the q-axis current compensating component is $I_{qre\_comp}$, it is set to 0 by the following Equation 11:

$$i_{qre\_comp} = 0.$$

Referring to FIG. 12, when the output of a synchronization controller is the q-axis current compensating value ($I_{qre\_comp}$) and the d-axis current compensating value ($I_{dre\_comp}$), the output of the active power controller is $i_{qr}^{e*}$, the output of the reactive power is $i_{dr}^{e*}$, if the input of a current controller in the generator-side converter 410 is determined by the following Equation 12, it is possible to implement a power converter which can concurrently perform the control of the active power and the reactive power while having a synchronization function.

$$\text{error}_{i_{qr}} = i_{qr}^{e*} + i_{qre\_comp} - i_{qr}^e$$

$$\text{error}_{i_{dr}} = i_{dr}^{e*} + i_{dre\_comp} - i_{dr}^e \quad \text{[Equation 12]}$$

The inventive doubly-fed induction generator having an automatic system connection function of FIG. 10

Dissimilarly to the conventional method of calculating the slip phase angle using the phase angle calculated from the system voltage and the phase angle calculated from the encoder, the encoder compensating angle ($\theta_{offset}$) is used additionally and the slip phase angle ($\theta_{sl}$) is derived by the following Equation 13:

$$\theta_{sl} = \theta_s + \theta_{offset} - \theta_r \quad \text{[Equation 13]}$$

Now, an electric power converting method for controlling doubly-fed induction generators as an operation controlling method of the electric power converting device for controlling doubly-fed induction generators according to the present invention will be described hereinafter with reference to the accompanying drawings.

Figure 13A:
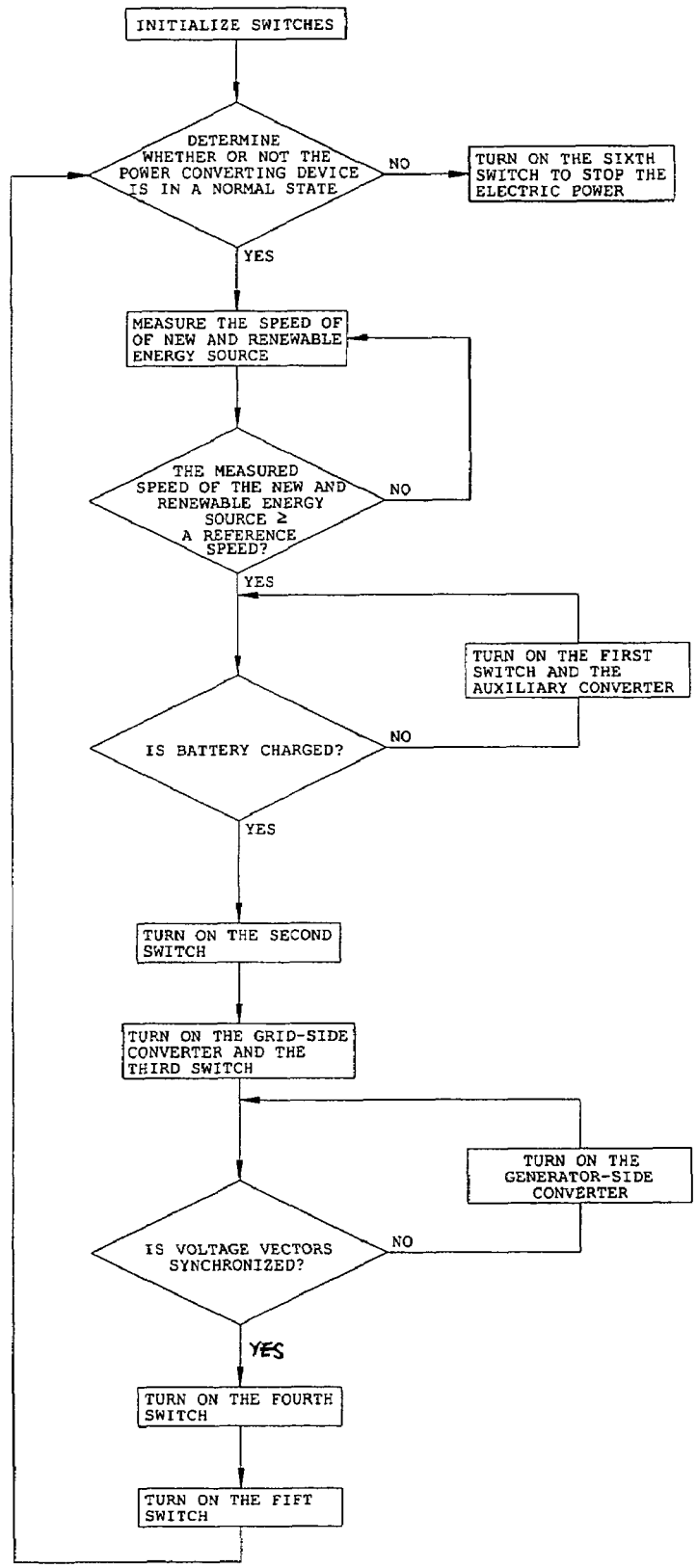
FIG. 13a is a flow chart illustrating an electric power converting method for controlling doubly-fed induction generators according to the present invention.
Figure 13B:
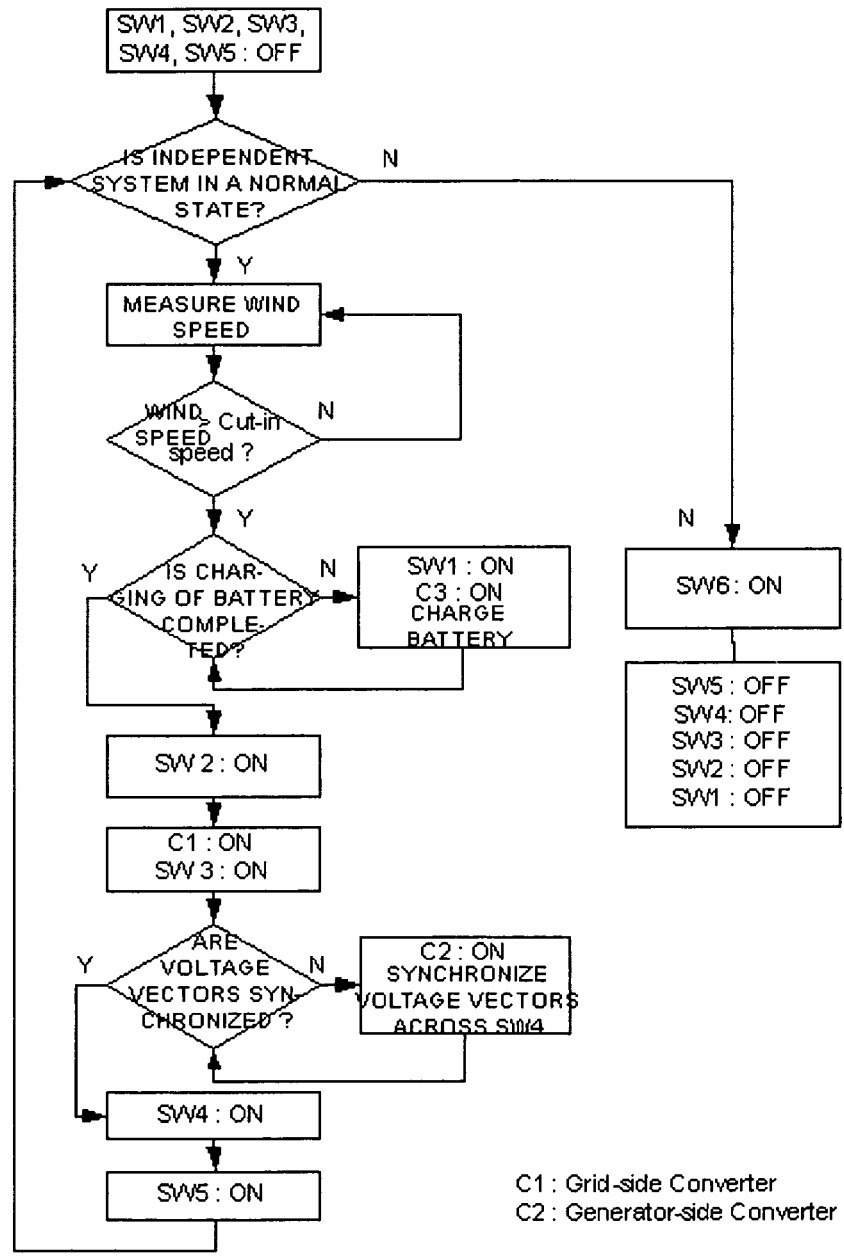
FIG. 13b is a flow chart illustrating a method of controlling the operation of an electric power converting device for controlling doubly-fed induction generators according to the present invention.

FIG. 13a is a flow chart illustrating an electric power converting method for controlling doubly-fed induction generators according to the present invention, and FIG. 13a is a flow chart illustrating an operation controlling method of an electric power converting device for controlling doubly-fed induction generators according to the present invention.

First, the electric power converting device for controlling doubly-fed induction generators according to the present invention includes a first switch disposed between the synchronous generator and the auxiliary converter, a second switch the disposed between the auxiliary converter and the power converter, a third switch disposed between the power converter and the AC system, a fourth switch disposed between the doubly-fed induction generator and the AC system, a fifth switch disposed between the third switch and the fourth switch and the AC system, and a sixth switch disposed between the doubly-fed induction generator and the power converter (see FIG. 4b).

Referring to FIG. 13a, at step (a), the first to sixth switches are turned off to be initialized.

At step (b), the controller 500 determines whether or not the electric power converting device for controlling a doubly-fed induction generator 100 is in a normal state. At step (b), an independent system voltage is measured to check voltage dip, voltage swell, flicker, etc., to determine if the electric power converting device for controlling a doubly-fed induction generator 100 is in a normal state.

In this case, the controller 500 determines if the drive of the electric power converting device for controlling a doubly-fed induction generator 100 is enabled by considering whether or not the power converter 400 is in a normal state, and an over-wind speed or over-speed of tidal current condition exists.

At step (b), if it is determined that the electric power converting device for controlling the doubly-fed induction generator 100 is in a normal state, the program proceeds to step (d) in which the speed of a new and renewable energy source is measured. Here, the speed of a new and renewable energy source means wind speed or speed of tidal current, etc.

At step (d), the speed of a new and renewable energy source is compared with a reference speed. At this time, the speed of a new and renewable energy source is compared with a reference value such as a cut-in speed, i.e., a minimum wind speed (or minimum current speed value) so as to judge whether the electric power converting device for controlling the doubly-fed induction generator 100 reaches a drivable condition after measuring the wind speed or current speed.

On the other hand, at the above step (b), if it is determined that the electric power converting device for controlling the doubly-fed induction generator 100 is not in a normal state, the program proceeds to step (e) where the sixth switch is turned on so as to stop the electric power converting device.

If it is determined at step (d) that the measured speed of the new and renewable energy source is larger than a reference speed, the program proceeds step (f) where the controller 500 determines whether or not a terminal voltage of the battery 330 of the auxiliary converter 300 exceeds a reference voltage.

In this case, if it is determined wind speed (or current speed) measured at step (c) is larger than the cut-in speed reference value (or minimum current speed reference value), normal electric generation is enabled and hence the electric power converting device for controlling the doubly-fed induction generator is ready to be driven. To this end, at step (h), the controller 500 checks the charge state of the battery 330 of the auxiliary converter 300.

If it is determined at step (d) that the measured speed of the new and renewable energy source is smaller than the reference speed, the program returns to the previous step (c) via step (g), where the controller 500 repeatedly performs the step (c).

If it is determined at step (f) that the terminal voltage of the battery 330 of the auxiliary converter 300 exceeds the reference voltage, i.e., the charging of the battery is completed, the program proceeds to step (h) where the controller 500 turns the second switch on so as to interconnect the auxiliary converter 300 and the DC link capacitor 420.

Thus, the second switch is turned on so as to charge the DC link capacitor 420 using the energy (current and voltage) charged in the battery 330 of the auxiliary converter 300.

If, on the other hand, it is determined at step (f) that the terminal voltage of the battery 330 of the auxiliary converter 300 does not exceed the reference voltage, i.e., the charging of the battery is not completed, the program proceeds to step (i) where the controller 500 turns the first switch on to charge the battery beyond the reference voltage, and then returns to the previous step (f) where the controller repeatedly perform the step (f). In this case, the first switch is turned on using the synchronous generator 200 so as to charge the battery through the auxiliary converter 300.

The DC link capacitor 420 is charged at step (f) so that a DC voltage charged in the DC link capacitor 420 is converted into an AC voltage by the grid-side converter 430 to generate an AC power for application to the AC system 600 by turning on the third switch. Here, the converted AC voltage is an independent power source having a system frequency and a system voltage.

At subsequent step (k), the controller determines whether or not the voltage generated from the doubly-fed induction generator 100 and the voltage generated from the grid-side converter 430 are synchronized with each other. If it is determined at step (k) that the voltage generated from the doubly-fed induction generator 100 and the voltage generated from the grid-side converter 430 are synchronized with each other, the program proceeds to step (l) where the fourth switch is turned on.

On the other hand, if it is determined at step (k) that the voltage generated from the doubly-fed induction generator 100 and the voltage generated from the grid-side converter 430 are not synchronized with each other, the program proceeds to step (m) where the generator-side converter 410 is turned on so as to regulate the magnitude of a d-axis current component within the generator-side converter 410 for synchronization.

At step (n), the controller turns on the fifth switch so as to transmit the AC voltage generated from the grid-side converter 430 to the AC system 600, and then the program returns to the previous step (b) via step (o), where the controller 500 repeatedly performs the step (b) to determine whether or not the electric power converting device for controlling a doubly-fed induction generator 100 is in a normal state.

As apparent from the foregoing, according to an electric power converting device for controlling doubly-fed induction generators of the present invention, the synchronous generator as an auxiliary generator is included independently of the doubly-fed induction generator as a main generator so that an auxiliary power is secured irrespective of the system power to thereby eliminate the need of the system power. Thus, the doubly-fed induction generator can be applied to a new and renewable energy system using a marine wind power, tidal current power, wave power, etc., located remotely from the system line to thereby construct an independent system.

In addition, according to the electric power converting device for controlling doubly-fed induction generators of the present invention, the grid-side converter is constructed of a three-phase four-wire converter so that a stable balanced voltage is supplied to generate electricity without stopping the operation of the new and renewable energy source (wind power, tidal current power, tidal power, wave power, etc.) even in an unbalanced condition.

Furthermore, there is proposed a control method of the generator-side converter which can automatically synchronize a stator voltage of the doubly-fed induction generator and a system voltage with each other at any time without being affected by the installation position of an encoder while maintaining a function of controlling active power and reactive power as it is, thereby improving the control property of the electric power converting device.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An electric power converting device for controlling doubly-fed induction generators, comprising:
    a doubly-fed induction generator, a power converter for converting electric energy of the doubly-fed induction generator for application to an alternate current (AC) system, a controller for PWM-controlling the power converter, and the AC system adapted to use an AC power supplied thereto from the power converter, wherein the doubly-fed induction generator further comprises:
    a synchronous generator for generating a separate auxiliary electric power independently of the doubly-fed induction generator; and
    an auxiliary converter for converting energy supplied thereto from the synchronous generator into a direct current (DC) power for application to the power converter,
    wherein the power converter includes:
    a generator-side converter for converting an AC power converted from electric energy of the doubly-fed induction generator into a DC power;
    a DC link capacitor connected to the generator-side converter in such a fashion as to be connected in parallel with the auxiliary converter, for storing electric energy; and
    a grid-side converter for re-converting the DC power converted by the generator-side converter into the AC power for application to the AC system, the DC link capacitor being disposed between the generator-side converter and the grid-side converter.

2. The electric power converting device as set forth in claim 1, wherein the auxiliary converter comprises:
    a rectifier connected to the synchronous generator for converting an AC power supplied from the synchronous generator into a DC power;
    a smoothing capacitor connected in parallel with the rectifier for smoothing the output power of the rectifier; and
    a battery connected in parallel the smoothing capacitor and connected in parallel with the DC link capacitor of the power converter, for storing the output power of the smoothing capacitor.

3. The electric power converting device as set forth in claim 2 further comprising:
    a bypass resistor connected between the smoothing capacitor and the battery for bypassing power overcharged in the smoothing capacitor; and
    a switch connected in series with the bypass resistor for selectively operating the bypass resistor.

4. The electric power converting device as set forth in claim 1, wherein the grid-side converter of the power converter is configured of a three-phase four-wire structure having four legs each of which has two switching means.

5. The electric power converting device as set forth in claim 1 further comprising:
    a slip angle calculator for receiving a rotational angle($\theta_r$) of the doubly-fed induction generator from the generator-side converter, an offset angle($\theta_{offset}$), and a stator angle ($\theta_s$) calculated from a stator voltage so as to output a slip angle ($\theta_{sl}$) for application to the controller; and a synchronization means for calculating the offset angle ($\theta_{offset}$) generated therefrom to output the calculated result to the slip angle calculator so as to control phase synchronization, and for outputting a d-axis current compensating component ($i_{dre\_comp}$) of the rotor current and a q-axis current compensating component ($i_{qre\_comp}$) of the rotor current to the controller.

6. The electric power converting device as set forth in claim 5, wherein the synchronization means further comprises a PI controller for controlling a voltage error ($v_{d\_err}$) between a d-axis component($v_{ds2}^e$) of the voltage induced from the stator winding and a d-axis component($v_{ds1}^e$) of the system voltage to be maintained at 0 so as to make the voltage induced from the stator winding and the system voltage identical to each other in terms of phase, and determines an output of the PI controller 561 as the offset angle($\theta_{offset}$) for correcting an encoder phase angle, wherein the voltage error ($v_{d\_err}$) and the offset angle($\theta_{offset}$) are derived from the following Equation:

$$V_{d\_err} = -v_{ds2}^e$$

$$\theta_{offset} = PI(V_{d\_err}).$$

7. The electric power converting device as set forth in claim 6, wherein the synchronization means allows a voltage error ($v_{d\_err}$) between a q-axis component($v_{qs2}^e$) of the voltage induced from the stator winding and a q-axis component ($v_{qs1}^e$) of the system voltage to be controlled to be maintained at 0 using the PI controller so as to make the voltage induced from the stator winding and the system voltage identical to each other in terms of magnitude, and determines an output of the PI controller as a q-axis current compensating component ($i_{dre\_comp}$) wherein the a q-axis current compensating component ($i_{dre\_comp}$) is derived from the following Equation to be always set to 0:

$$V_{q\_err} = V_{qs1}^e - V_{qs2}^e.$$

8. The electric power converting device as set forth in claim 5, wherein the synchronization means further comprises a limiter for preventing the d-axis current compensating component ($i_{dre\_comp}$) of the rotor current from being increased sharply by an output of the PI controller, and has a feed-forward component so as to increase a convergence speed, wherein the d-axis current compensating component ($i_{dre\_comp}$) is derived from the following Equation:

$$i_{dre\_comp} = \text{Limit}\{PI(V_{q\_err}), i_{dre\_comp\_limit}\} + i_{dre\_comp\_ff}.$$

9. The electric power converting device as set forth in claim 8, wherein the feed-forward component ($i_{dre\_comp\_ff}$) is set to $$i_{dre\_comp\_ff} = \frac{E}{\omega_e L_o},$$

and is derived as follows so as to be adjusted at less than 100%:

$$i_{dre\_comp\_limit} \leq \frac{E}{\omega_e L_o} * \text{Scaler} \quad (0.0 \leq \text{Scaler} \leq 1.0).$$

10. The electric power converting device as set forth in claim 5, wherein the slip angle calculator determines the slip angle ($\theta_{sl}$) using the stator voltage angle ($\theta_s$) calculated from voltage induced from the stator winding, the rotational angle ($\theta_r$) of the generator and the offset angle ($\theta_{offset}$) output from the synchronization means, wherein the slip angle ($\theta_{sl}$) is derived from the following Equation:

$$\theta_{sl} = \theta_s + \theta_{offset} - \theta_r.$$

11. The electric power converting device as set forth in claim 5, wherein the controller controls a q-axis current compensating component ($i_{qre\_comp}$) to be combined at a position where a q-axis reference value component of a rotor current determined as a controlled active power output and a q-axis component of an actual rotor current meet with each other, and controls a d-axis current compensating component ($i_{dre\_comp}$) to be combined at a position where a d-axis reference value component of a rotor current determined as a controlled reactive power output and a d-axis component of an actual rotor current meet with each other to control the current of the d-axis and q-axis so as to control an active power and a reactive power in a stator winding, wherein a d-axis PI controller input ($error_{i_{dr}}$) and q-axis PI controller input ($error_{i_{qr}}$) are derived by the following Equation:

$$error_{i_{qr}} = i_{qr}^{e*} + i_{qre\_comp} - i_{qr}^e$$

$$error_{i_{dr}} = i_{dr}^{e*} + i_{dre\_comp} - i_{dr}^e.$$

12. The electric power converting device as set forth in claim 1, wherein the slip angle calculator further includes a low pass filter (LPF) having a cut-off frequency of approximately 5 kHz when a grid-side phase voltage $v_{as}$, $v_{bs}$, $v_{cs}$ and a voltage $v_{at}$, $v_{bt}$, $v_{ct}$ induced to the stator winding are converted into a d-q coordinate system to calculate $v_{ds1}^e$, $v_{qs1}^e$, $v_{ds2}^e$, $v_{qs2}^e$.

13. An electric power converting method of an electric power converting device for controlling doubly-fed induction generators, the power converting device including a first switch disposed between the synchronous generator and the auxiliary converter, a second switch the disposed between the auxiliary converter and the power converter, a third switch disposed between the power converter and the AC system, a fourth switch disposed between the doubly-fed induction generator and the AC system, a fifth switch disposed between the third switch and the fourth switch and the AC system, and a sixth switch disposed between the doubly-fed induction generator and the power converter, wherein the power converting method comprising the steps of:

(a) turning off the first to sixth switches to initialize the first to sixth switches;

(b) determining whether or not the electric power converting device for controlling a doubly-fed induction generator is in a normal state;

(c) if it is determined that the electric power converting device for controlling the doubly-fed induction generator is in a normal state, measuring the speed of a new and renewable energy source;

(d) comparing the measured the speed of a new and renewable energy source with a reference speed;

(e) if it is determined at step (b) that the electric power converting device for controlling the doubly-fed induction generator is not in a normal state, turning on the sixth switch so as to stop the electric power converting device;

(f) if it is determined at step (d) that the measured speed of the new and renewable energy source is larger than the reference speed, determining whether or not a terminal voltage of the battery of the auxiliary converter exceeds a reference voltage;

(g) if it is determined at step (d) that the measured speed of the new and renewable energy source is smaller than the reference speed, repeatedly performing the step (c);

(h) if it is determined at step (f) that the terminal voltage of the battery 330 of the auxiliary converter exceeds the reference voltage, i.e., the charging of the battery is completed, turning on the second switch so as to interconnect the auxiliary converter and the DC link capacitor;

(i) if it is determined at step (f) that the terminal voltage of the battery of the auxiliary converter does not exceed the reference voltage, i.e., the charging of the battery is not completed, turning on the first switch so as to charge the battery beyond the reference voltage through the auxiliary converter, and then repeatedly performing the step (f);

(j) converting a DC voltage of the DC link capacitor charged at step (f) into an AC voltage by the grid-side converter to generate an AC power for application to the AC system by turning on the third switch;

(k) determining whether or not the voltage generated from the doubly-fed induction generator and the voltage generated from the grid-side converter are synchronized with each other;

(l) if it is determined at step (k) that the voltage generated from the doubly-fed induction generator and the voltage generated from the grid-side converter are synchronized with each other, turning on the fourth switch;

(m) if it is determined at step (k) that the voltage generated from the doubly-fed induction generator and the voltage generated from the grid-side converter are not synchronized with each other, turning on the generator-side converter so as to regulate the magnitude of a d-axis current component within the generator-side converter for synchronization, and then repeatedly performing the step (k);

(n) turning on the fifth switch so as to transmit the AC voltage generated from the grid-side converter to the AC system; and (o) repeatedly performing the step (b) to determine whether or not the electric power converting device for controlling a doubly-fed induction generator is in a normal state.

\* \* \* \* \*